US007003780B2

(12) United States Patent
Peloquin et al.

(10) Patent No.: US 7,003,780 B2
(45) Date of Patent: Feb. 21, 2006

(54) METHOD AND AN APPARATUS TO EXTEND THE LOGIC VOLUME MANAGER MODEL TO ALLOW DEVICE MANAGEMENT PLUG-INS

(75) Inventors: Mark A. Peloquin, Austin, TX (US); Benedict Michael Rafanello, Round Rock, TX (US); Cuong Huu Tran, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 700 days.

(21) Appl. No.: 09/734,811

(22) Filed: Dec. 11, 2000

(65) Prior Publication Data

US 2002/0073268 A1 Jun. 13, 2002

(51) Int. Cl.
*G06F 13/10* (2006.01)

(52) U.S. Cl. .................. 719/321; 719/331; 719/327; 713/1; 713/100; 711/156; 711/165

(58) Field of Classification Search .............. 719/331, 719/332, 321, 310; 713/1, 100; 711/156, 711/165; 710/74; 709/327
See application file for complete search history.

(56) References Cited

U.S. PATENT DOCUMENTS

| 5,129,088 A | * | 7/1992 | Auslander et al. ............. 711/1 |
| 5,784,703 A | | 7/1998 | Muraoka et al. ............ 711/173 |
| 5,787,019 A | | 7/1998 | Knight et al. ................ 364/550 |
| 5,829,053 A | * | 10/1998 | Smith et al. ................. 711/202 |
| 5,915,131 A | | 6/1999 | Knight et al. ................ 395/892 |
| 5,933,646 A | | 8/1999 | Hendrickson et al. ....... 395/712 |
| 5,940,849 A | * | 8/1999 | Koyama ........................ 711/4 |
| 5,968,184 A | | 10/1999 | Kedem ........................... 714/7 |
| 5,983,316 A | | 11/1999 | Norwood .................... 711/112 |
| 6,112,276 A | | 8/2000 | Hunt et al. ................. 711/112 |
| 6,122,685 A | * | 9/2000 | Bachmat ..................... 710/74 |
| 6,145,067 A | * | 11/2000 | Kuwata ...................... 711/165 |
| 6,370,626 B1 | * | 4/2002 | Gagne et al. ............... 711/154 |
| 6,405,366 B1 | | 6/2002 | Lorenz, Sr. et al. |
| 6,523,047 B1 | | 2/2003 | Rafanello et al. .......... 707/200 |

OTHER PUBLICATIONS

M. Frans Kaashoek, The logical Disk : A new Approach to Improving file system, Jul. 22, 1998.*
IBM, IBM to release LVM teachology to the linux, Jun. 27, 2000.*

* cited by examiner

*Primary Examiner*—Sue Lao
*Assistant Examiner*—LeChi Truong
(74) *Attorney, Agent, or Firm*—Duke W. Yee; David A. Mims, Jr.; Gerald H. Glanzman

(57) ABSTRACT

Logical disks are provided, which are created by device managers. The logical volume manager is modified to use only logical disks. The device managers may be plug-in modules. This allows new device managers to be added to the logical volume manager at any time without changing the code in the logical volume manager. Anything that can be made to appear as a logical disk through the use of a device manager plug-in may then be used with the logical volume manager. A device manager for network attached storage may be written allowing network attached storage devices to be treated as local disk drives by the logical volume manager, thereby allowing all of the capabilities of the logical volume manager to be used with the network attached storage devices.

14 Claims, 4 Drawing Sheets

METHOD AND AN APPARATUS TO EXTEND THE LOGIC VOLUME MANAGER MODEL TO ALLOW DEVICE MANAGEMENT PLUG-INS

RELATED APPLICATIONS

The present application is related to commonly assigned and co-pending U.S. patent application Ser. No. No. 09/697,579 entitled "A METHOD AND AN APPARATUS FOR DYNAMIC COMMAND LINE PARSING IN THE PRESENCE OF MULTIPLE PLUG-IN COMPONENTS", Ser. No. 09/697,449 entitled "A METHOD AND AN APPARATUS TO DYNAMICALLY ORDER FEATURES AND TO RESOLVE CONFLICTS IN A MULTIPLE-LAYER LOGICAL VOLUME MANAGEMENT ENVIRONMENT", Ser. No. 09/697,450 entitled "A METHOD AND AN APPARATUS FOR VOLUME CREATION IN THE PRESENCE OF MULTIPLE AGGREGATORS", filed on Oct. 26, 2000, and Ser. No. 09/734,812 entitled "A METHOD AND AN APPARATUS FOR LOGICAL VOLUME MANAGER PLUG-INS", filed on an even date herewith, and hereby incorporated by reference.

BACKGROUND OF THE INVENTION

1. Technical Field

The present invention relates generally to an improved method to manage logical volumes and, in particular, to a method and an apparatus for providing a logical disk in a logical volume management system. Still more particularly, the present invention provides a method and an apparatus to allow device management plug-ins in a logical volume management system.

2. Description of the Related Art

The Logical Volume Manager (LVM) is a subsystem for on-line disk storage management that adds an additional layer between the physical devices and the block I/O interface in the kernel of the operating system to allow a logical view on storage. For systems without an LVM, each of the partitions that is usable by the operating system is assigned a drive letter, such as "C:" or "F:", producing a correlating drive letter for each partition on a disk in the computer system. The process which assigns these letters is commonly known.

For systems with an LVM, a drive letter may be mapped instead to a logical volume which may contain one or more partitions. The process by which partitions are combined into a single entity is known generically as "aggregation."

There are various forms of aggregation, such as Drive Linking and software Redundant Array of Independent Disks ("RAID"). Each feature, i.e. a function that may be performed on a partition, aggregate or volume, offered by the LVM for use on a volume is a layer in the LVM. The input to a layer has the same form and structure as the output from a layer. The layers being used on a volume form a stack, and I/O requests are processed from the top most layer down the stack to the bottom most layer. Typically, the bottom most layer is a special layer called the Pass Through layer.

U.S. patent application Ser. No. 09/561,184, which is hereby incorporated by reference, discloses a multi-layer logical volume management system for an LVM in the OS/2 operating system. Similar systems can be extended to handle multiple levels of aggregation in other operating systems.

Currently, the OS/2 LVM uses OS/2 direct access storage device (OS2DASD) for a device manager. It is the only device manager that the OS/2 LVM uses. This limits the devices that the OS/2 LVM can be used with to those that OS2DASD can handle. Currently, OS2DASD will handle only local devices. Extensive modification would be required to handle network attached devices. Furthermore, revising OS2DASD for every new class of devices is expensive and dangerous as it raises the possibility of destabilizing existing code.

Therefore, it would be advantageous to have a method and an apparatus to enhance the logical volume management model to allow improved device manager support.

SUMMARY OF THE INVENTION

The present invention provides an abstraction called a "logical disk" herein. Logical disks are created by device managers. The LVM is modified to use only logical disks. The device managers may be plug-in modules. This allows new device managers to be added to the LVM at any time without changing the code in the LVM. Anything that can be made to appear as a logical disk through the use of a device manager plug-in may then be used with the LVM. A device manager for network attached storage may be written allowing network attached storage devices to be treated as local disk drives by the LVM, thereby allowing all of the capabilities of the LVM to be used with the network attached storage devices.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
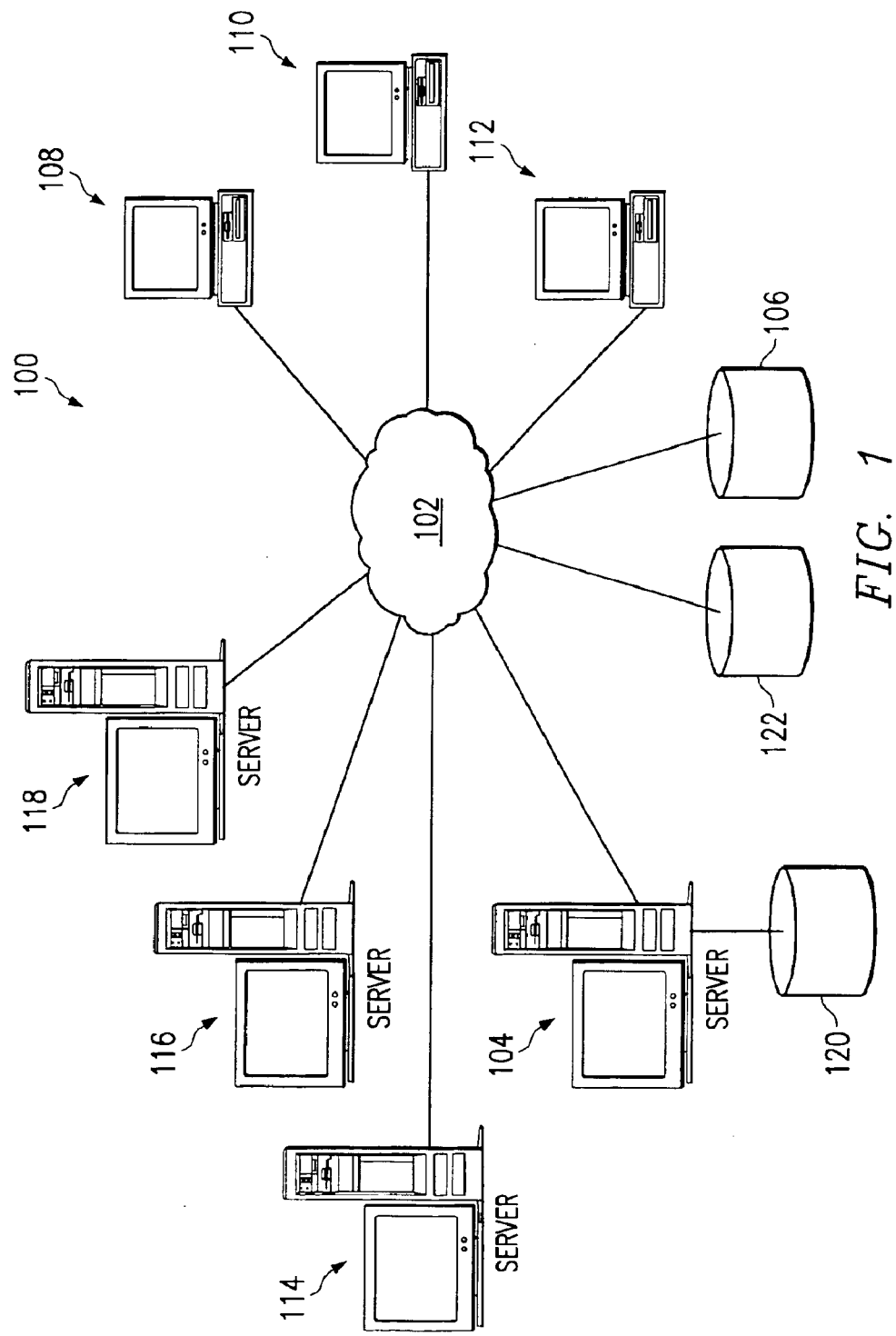
FIG. 1 is a pictorial representation of a distributed data processing system in which the present invention may be implemented.

With reference now to the figures, and in particular with reference to FIG. 1, a pictorial representation of a distributed data processing system is depicted in which the present invention may be implemented.

Distributed data processing system 100 is a network of computers. Distributed data processing system 100 contains network 102, which is the medium used to provide communications links between various devices and computers connected within distributed data processing system 100. Network 102 may include permanent connections, such as wire or fiber optic cables, or temporary connections made through telephone connections.

In the depicted example, servers 104, 114, 116 and 118 are connected to network 102. Storage units 106 and 122 are also connected to network 102, providing backup support for any or all of servers 104, 114, 116 and 118. Storage unit 122 provides dedicated backup support for server 104. In addition, clients 108, 110 and 112 are also connected to network 102. These three clients may be, for example, personal computers or network computers. For purposes of this application, a network computer is any computer coupled to a network, which receives a program or other application from another computer coupled to the network. Distributed data processing system 100 may include additional servers, clients, and other devices not shown.

In the depicted example, servers 104, 114, 116 and 118 provide storage for data from clients 108, 110 and 112. These four servers also provide data, such as boot files, operating system images, and applications to clients 108, 110 and 112. Clients 108, 110 and 112 are clients to one or all of servers 104, 114, 116 and 118. Support for a particular application being performed on one of clients 108, 110 and 112 may be by one of servers 104, 114, 116 and 118. Additionally servers 104, 114, 116 and 118 may provide backup support for each other. In the event of a server failure, a redundant backup server may be allocated by the network administrator, in which case requests directed to the failed server are routed to the redundant backup server.

In a similar manner, data backup support is provided by storage units 106 and 122 for servers 104, 114, 116 and 118. However, rather than the network administrator allocating a data backup storage unit at each use, data backup allocation is set, and data backup transfer occurs at low usage times, typically after midnight, between any of servers 104, 114, 116 and 118 and storage units 106 and 122.

In the depicted example, distributed data processing system 100 may be the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks, such as, for example, an intranet or a local area network. FIG. 1 is intended as an example and not as an architectural limitation for the processes of the present invention.

Figure 2:
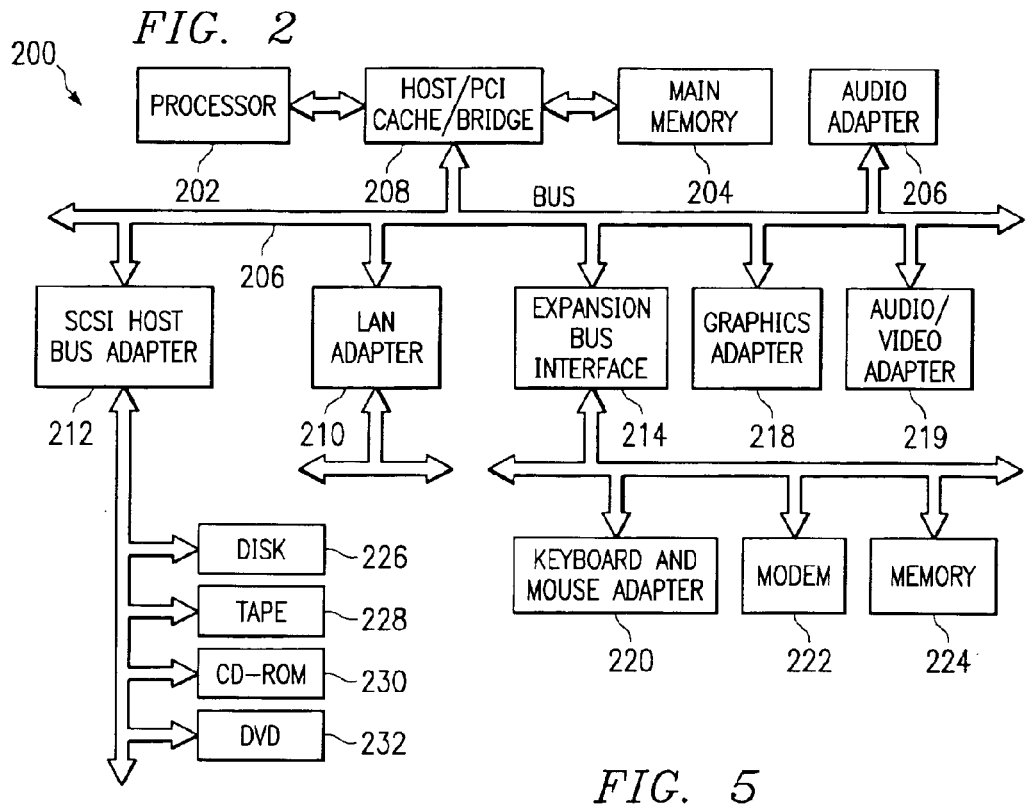
FIG. 2 is a block diagram of a data processing system that may be implemented as a server or a client in which the present invention may be implemented.

With reference now to FIG. 2, a block diagram of a data processing system in which the present invention may be implemented is illustrated. Data processing system 200 is an example of a client computer. Data processing system 200 employs a peripheral component interconnect (PCI) local bus architecture. Although the depicted example employs a PCI bus, other bus architectures, such as Micro Channel and ISA, may be used. Processor 202 and main memory 204 are connected to PCI local bus 206 through PCI bridge 208. PCI bridge 208 may also include an integrated memory controller and cache memory for processor 202. Additional connections to PCI local bus 206 may be made through direct component interconnection or through add-in boards. In the depicted example, local area network (LAN) adapter 210, SCSI host bus adapter 212, and expansion bus interface 214 are connected to PCI local bus 206 by direct component connection. In contrast, audio adapter 216, graphics adapter 218, and audio/video adapter (A/V) 219 are connected to PCI local bus 206 by add-in boards inserted into expansion slots.

Expansion bus interface 214 provides a connection for a keyboard and mouse adapter 220, modem 222, and additional memory 224. In the depicted example, SCSI host bus adapter 212 provides a connection for hard disk drive 226, tape drive 228, CD-ROM drive 230, and digital video disc read only memory drive (DVD-ROM) 232. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system, such as OS/2, which is available from International Business Machines Corporation. "OS/2" is a trademark of International Business Machines Corporation.

Those of ordinary skill in the art will appreciate that the hardware in FIG. 2 may vary depending on the implementation. For example, other peripheral devices, such as optical disk drives and the like, may be used in addition to or in place of the hardware depicted in FIG. 2. The depicted example is not meant to imply architectural limitations with respect to the present invention. For example, the processes of the present invention may be applied to multiprocessor data processing systems.

The invention is preferably realized using a well-known computing platform, such as an IBM personal computer, running the IBM OS/2 operating system. However, it may be realized in other popular computer system platforms, such as a Sun Microsystems workstation or IBM RS/6000 workstation, running alternate operating systems such as Microsoft Windows, HP-UX, UNIX or LINUX, without departing from the spirit and scope of the invention.

The present invention provides a mechanism by which features of a logical volume manager (LVM) are dynamically ordered and conflicts between features in a multiple-layer logical volume management environment are resolved. The logical volume manager (LVM) may be implemented in a a data processing device, such as data processing device 200 in FIG. 2, or the like. The present invention provides a classification system by which features of the LVM are classified such that conflicts between features may be readily identified. The classification system also allows for a default ordering which may be near optimal.

The present invention provides an architecture hereinafter referred to as Enterprise Volume Management System (EVMS) architecture. The EVMS consists of two basic components: the LVM Engine and the LVM Runtime. The LVM Engine runs in user space, while the LVM Runtime runs in kernel space. The LVM Runtime allows the operating system to access and use properly configured volumes. The creation, configuration, and management of volumes, volume groups, partitions, and the disks they reside on is handled by the LVM Engine. Thus, the LVM Engine handles setup and initialization, while the LVM Runtime handles the actual use of the volumes. This division of labor between the LVM Runtime and the LVM Engine is designed to reduce the size of, and the kernel resources required by, the LVM Runtime.

One of the unique features of the EVMS of the present invention is its ability to accept plug-in modules. A plug-in module consists of executable code which can be loaded and run by the EVMS. Plug-in modules allow the capabilities of the EVMS to be expanded without having to alter the code of the EVMS itself. This simplifies development and maintenance while increasing the stability of the EVMS over time. This is also the main mechanism for allowing the EVMS to emulate other LVM systems.

Features may be provided to the LVM in many different ways. The features may be hard-coded into the LVM, provided as part of software updates, and the like. In a preferred embodiment of the present invention, features are provided as plug-in components of the LVM. A plug-in component is an auxiliary hardware or software component that works with a major software package to enhance its capabilities. The use of plug-in components to modify the features offered by an LVM allows for updating and increasing the capabilities of the LVM.

The classification system of the present invention classifies these plug-in features into one of five different classifications:

1) Device Manager—A plug-in designed to communicate and manage the storage devices available to the system;

2) Partition Manager—A plug-in that is designed to recognize and manipulate the partition information on a device;

3) Volume Group Emulator (VGE)—A plug-in that is used when volume group support is desired, or when emulating a volume group based LVM;

4) Feature—A plug-in that is used to assemble volumes; and

5) Filesystem Interface Module—A plug-in that allows the LVM to perform basic filesystem tasks, such as formatting, checking, and resizing, as well as gather information about the filesystem in use on a volume before performing operations that would have an effect upon the filesystem (volume expansion or shrinking, for instance).

Examples of device managers may be a local storage manager for accessing local storage devices or a storage area network (SAN) manager, which would allow the system to access and use storage on a storage area network. Examples of partition managers may be a disk operating system (DOS) partition manager for accessing disks partitioned by DOS™, Windows™, or OS/2™. And a Macintosh™ partition manager for accessing disks partitioned by an Apple™ Macintosh computer. An example of a VGE may be an Advanced Interactive executive (AIX) VGE for accessing and manipulating volume groups created by the LVM in the AIX operating system. AIX is IBM's version of UNIX, which runs on 386 and higher personal computers, RS/6000 workstations, and 390 mainframes. Examples of features may be drive linking, RAID 0, RAID 5, mirroring, and encryption.

An individual plug-in module, if it is a device manager, partition manager, volume group emulator or feature, consists of two parts: the runtime module and the setup/initialization module. The runtime module is used by the LVM Runtime component in kernel space. The setup/initialization module will be used by the LVM Engine. Filesystem Interface Modules only have the setup/initialization part as they are only used by the LVM Engine.

Figure 3:
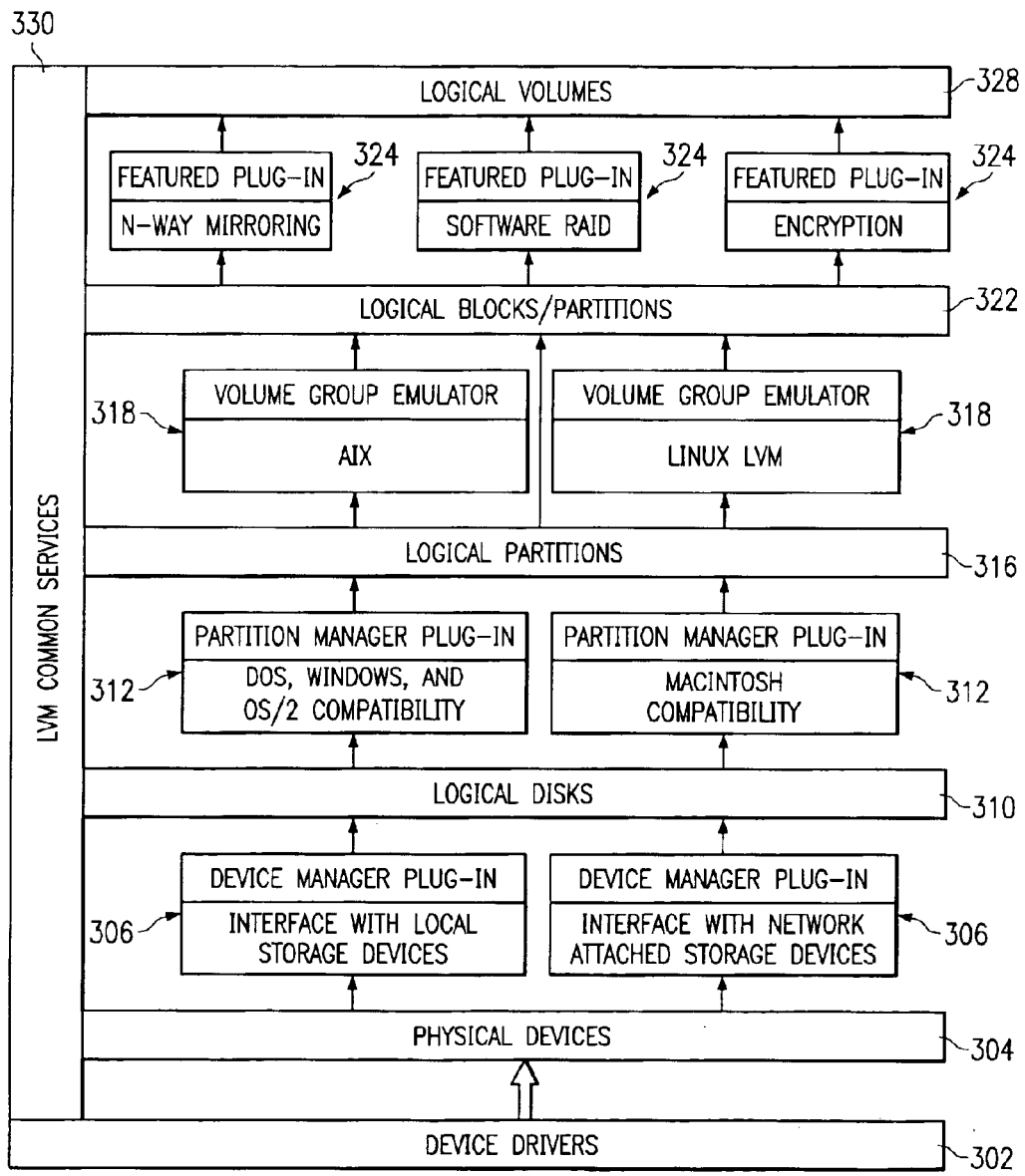
FIG. 3 is a diagram showing the basic organization of an LVM Runtime and LVM Engine components in accordance with a preferred embodiment of the present invention.

FIG. 3 shows the basic organization of an LVM Runtime and LVM Engine components in accordance with a preferred embodiment of the present invention. At the bottom of the figure are the physical devices 304. These devices are reported to the EVMS by the device drivers 302 in the system. The EVMS then uses the device manager plug-in modules 306 to transform the physical devices into logical disks 310. The EVMS then uses the partition manager plug-in modules 312 to transform the logical disks into logical partitions 316. Next, the EVMS uses the volume group emulator plug-in modules 318 to reconstruct any volume groups that may exist and export their logical blocks 322. Thereafter, the EVMS uses feature plug-in modules 324 to create logical volumes 328 from the logical partitions/blocks 322. The logical volumes created by the EVMS are then exported for use by the operating system.

The EVMS of the present invention contains several levels of abstraction. The first is that of the logical disk. This abstraction was introduced into the EVMS to provide a standard, consistent method for accessing the storage devices available to the system. Anything which can be made to appear as a logical disk can be managed by this EVMS. This may include storage obtained from a Storage Area Network (SAN) or other network attached device, for instance. The properties of a logical disk are:

It can be given a user defined name which will be stored on the actual underlying device. The name provided by the user must be unique as no two logical disks may have the same name. This name will persist across reboots and configuration changes. The name will travel with the device(s) that comprises the logical disk so that, when it is attached to another system employing this EVMS, the name assigned to it will be available to the EVMS on the new system.

It can be given an EVMS serial number which will be stored on the actual underlying device. Each logical disk in the system will be given a unique EVMS serial number which will then be used to identify the device to the EVMS. The EVMS guarantees that the EVMS serial number being assigned to the logical disk has not been assigned to another logical disk, logical partition or logical volume in the system.

It can store the EVMS serial number of the logical drive that the system boots from. This value is used to identify logical disks which have been moved from one system to another.

It can store the geometry assigned to it by the device manager which is managing it. This is necessary to allow the devices comprising the logical disk to be moved from one system to another.

It can store data—i.e., data written to a specific location on the logical disk can later be read from that location on the logical disk, barring a hardware error. Hardware errors are reported when encountered.

Logical disks are created by device managers. Device managers are used to control and communicate with the devices in the system, and make them appear as logical disks for use in the EVMS. Device Managers are plug-ins, meaning that they are code which is external to the EVMS, but which can be loaded and used by the EVMS as needed. As with other plug-in modules, all Device Managers have a unique name and a unique numeric ID. When the system is booting or when new hot pluggable devices have been added to the system, the device drivers report the devices they have discovered to the EVMS, who puts them into a list of unclaimed devices. The list of unclaimed devices is then presented to each of the available device managers, which may then claim a device and remove it from the list. When all of the devices have been claimed, or after all of the device managers have been given a chance to claim one or more devices, then any device managers which have not claimed any devices will be removed from memory and any devices which have not been claimed by a device manager will remain in the list of unclaimed devices. The final step in creating logical disks is for the EVMS to ask the device managers for a list of the logical disks they are managing. The EVMS combines the output from the device managers into one master list of logical disks, which is then used for all subsequent operations.

Each entry in the master list of logical disks contains all of the information required for the EVMS to manage that logical disk. Each entry also contains fields for use by a Partition Manager, should a Partition Manager claim the logical disk. Only one Partition Manager may claim a logical disk, and, once claimed, the partitioning scheme used on the logical disk, as well as any partitions created on the logical disk, will be controlled and managed by the Partition Manager claiming the logical disk.

The next layer of abstraction is the logical partition. This abstraction was created so that the EVMS is not tied to any particular partitioning scheme as many exist. The EVMS uses a generic memory management structure for tracking meta data, partitions and free space on a logical disk. Thus, all logical partitions appear the same regardless of the actual underlying partitioning scheme used. Logical partitions have the following properties:

- A logical partition consists of contiguous disk space on a logical drive.
- A logical partition starts at a specific address on a logical disk and ends at a specific address on a logical disk.
- A logical partition has a size.
- A logical partition can store data.
- A logical partition may have a user defined name associated with it. The name specified by the user must be unique in so far as no two logical partitions on the same logical disk may have the same name. Furthermore, this name is persistent, and will remain with the partition until the partition is deleted or until the user specifically changes it, regardless of reboots. The name will actually be stored on the logical disk containing the logical partition so that the name will travel with the partition should the underlying devices be moved to another system.
- A logical partition will have a unique, EVMS assigned serial number associated with it. This number will be assigned when the partition is created by the EVMS and will not change for as long as the partition exists. The EVMS guarantees that the EVMS serial number being assigned to the logical partition has not already been assigned to another logical disk, logical partition or logical volume in the system. The EVMS assigned serial number will be stored on the logical disk containing the logical partition so that it will travel with the logical disk/logical partition if they are moved to another system.
- All of the logical partitions on a logical disk will be managed by the same partition manager.

A partition manager is a plug-in component that interprets the partitioning scheme in use on a logical disk. It is used to create the generic memory management structure used by the EVMS to manage a logical disk, and it is used to convert that generic structure back into the actual data required by the partition scheme in use on a logical disk. It is also used to create, move, slide, resize and destroy partitions on a logical disk under its control. As with other plug-in modules, all partition managers have a unique name and a unique numeric ID.

Figure 4:
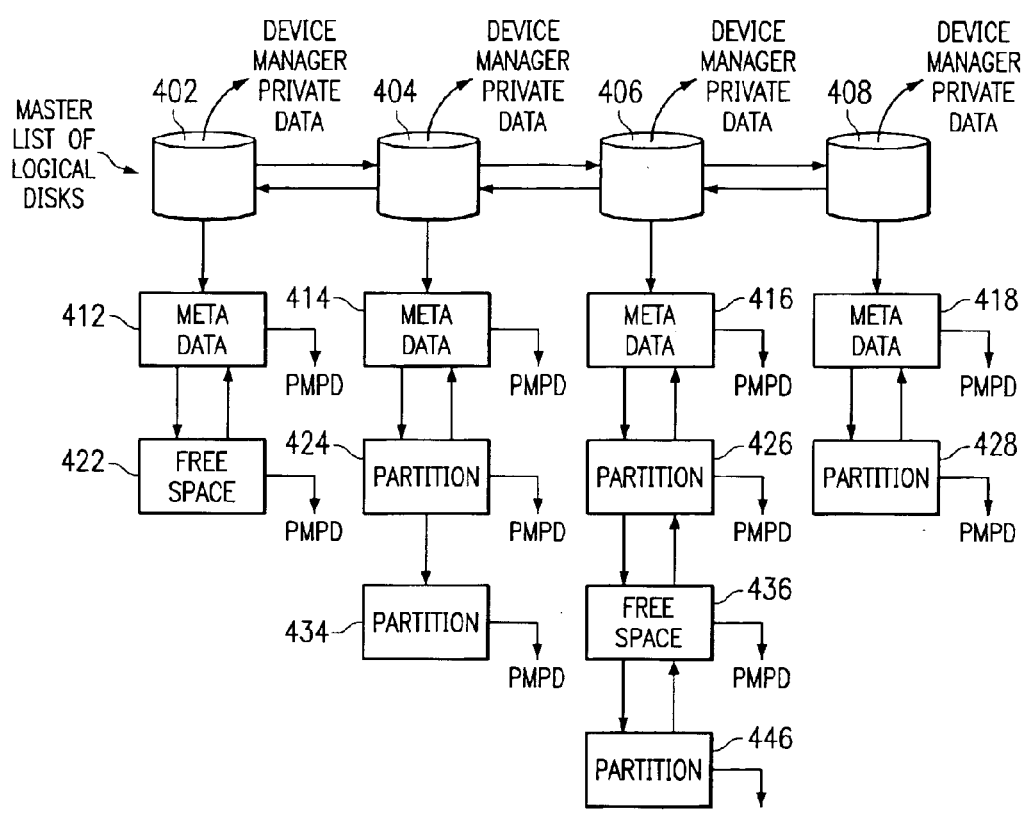
FIG. 4 shows the generic memory management structure used to manage a logical disk in accordance with a preferred embodiment of the present invention.

FIG. 4 shows the generic memory management structure used by the EVMS to manage a logical disk in accordance with a preferred embodiment of the present invention. Each entry in the list of logical disks maintained by the EVMS contains fields for use by the Partition Manager claiming the logical disk. One of these fields is a pointer to the partition list for the disk. The partition list consists of entries representing each allocated or unallocated block of space on the disk. An entry in the partition list may be marked as being either meta data, free space or a partition. Each entry in the partition list also contains a pointer for use by the partition manager associated with the logical disk that the partition list is for. This gives each partition manager a way to allocate memory and store, on a per entry basis, partition manager private data (PMPD). This private data is typically associated with the conversion process used to convert the partition list into the on-disk structures used by the partitioning scheme for the logical disk, and vice versa.

During boot, or when a new hot pluggable device is added to the system, the EVMS passes its master list of logical disks to the available partition managers. Each partition manager examines any disks in the list, which have not already been claimed by a partition manager, to see if they can interpret the partitioning scheme in use on the logical disk. If the partition manager recognizes the partitioning scheme in use on the logical disk, then it claims the logical disk. Claiming a logical disk prevents other partition managers from using that logical disk. When all logical disks have been claimed, or when all of the partition managers have had a chance to claim one or more logical disks, the partition managers which have not claimed at least one disk are removed from memory. Any logical disks which have not been claimed by a partition manager are marked as "new". When the user decides to use a logical disk which is marked "new", the user will have to designate one of the available partition managers to manage that logical disk. If the specified partition manager is already in memory, then it will claim the logical disk and prepare it for use. If the specified partition manager is not already in memory, it will be loaded, after which it will claim the logical disk and prepare it for use.

The disk objects are entries in the Master List of Logical Disks. Each entry is a generic logical disk data structure produced by a device manager. For each entry in the Master List of Logical Disks that is claimed by a Partition Manager, there is a list (or chain) of data entries created and maintained by the owning Partition Manager to describe the contents of the logical disk. The possible data elements are Meta Data, Logical Partitions, and Free Space. All logical disks owned by a Partition Manager will have Meta Data.

The number of logical partitions and blocks of free space is arbitrary, ranging from 0 to N, where N is an upper limit dictated by restrictions imposed by the policies of the owning Partition Manager. However, there is always at least one partition or at least one block of free space for each logical disk. The Meta Data entry contains unique partitioning information, such as a Partition Table found in the DOS partition scheme. This entry is followed by entries describing the allocation of space by partitions as well as the entries describing the areas of unallocated (or free) space within the logical disk. So the list, created by the owning Partition Manager, is a generic representation of the disk space utilization of a logical disk.

Also, each entry in the Partition Manager's generic data list (or chain) has a pointer to a unique and private data area available for use by the Partition Manager. This area can be used for storing and maintaining the necessary information to convert the generic data entry back and forth to the Partition Manager specific data formats or can be used for any other purpose the Partition Manager may deem appropriate.

Returning to the example in FIG. 4, the master list of logical disks includes logical disks 402, 404, 406, 408. Each logical disk is claimed by a partition manager. The list of data entries for logical disk 402 includes meta data 412 and free space 422. The list of data entries for logical disk 404 includes meta data 414, partition 424, and partition 434. The list of data entries for logical disk 406 includes meta data 416, partition 426, free space 436, and partition 446. The list of data entries for logical disk 408 includes meta data 418 and partition 428.

Volume groups are a construct found in many LVM systems. The Volume Group abstraction allows the EVMS to emulate volume group based LVMs found on other operating systems. Volume groups are constructed from one or more logical disks and/or logical partitions. The EVMS uses a generic structure for representing volume groups, and for tracking which logical disks and/or logical partitions belong to a volume group. Thus, all volume groups appear the same regardless of the actual underlying representation used.

A system employing the EVMS may or may not have volume groups. Volume groups are controlled by Volume Group Emulators (VGE), and, as these are plug-in modules, they are optional. If one or more VGEs are present and volume groups are found, the logical blocks within the volume group are exported for use by any feature plug-in modules which may be present in the system. Typically, if there is a VGE, then there will be at least one feature plug-in module that can combine the logical blocks exported from a volume group into the volumes which reside in the volume group. As with other plug-in modules, all VGEs have a unique name and a unique numeric ID.

During boot, or when a new hot pluggable device is added to the system, the EVMS will call each VGE to examine the available logical partitions in the system looking for logical partitions which belong to a volume group. The VGEs are also given the opportunity to scan the list of unclaimed logical drives looking for logical drives which belong to volume groups. If a VGE encounters a logical drive or logical partition which belongs to a volume group and all of the necessary logical disks and logical partitions are available to create the volume group, then the VGE will claim the logical disks and/or logical partitions and create the volume group. The volume group, once created (or recreated after a reboot) will be added to the EVMS list of volume groups, and the logical blocks contained within the volume group will be exported for use in the creation of logical volumes.

The last layer of abstraction is the logical volume. The logical volume is what is visible to the operating system. The operating system should only recognize logical volumes and physical devices. Any partitions which may exist on the physical devices should not be directly accessible to the operating system. Thus, all I/O to partitions and volumes must pass through the EVMS.

Features are plug-in components used by the EVMS to control I/O to the logical blocks/partitions that comprise a logical volume. The input to a feature is the same in format and structure as the output from a feature. This allows the output from one feature to be used as the input to another, which allows features to be stacked. Thus, multiple features may be applied to a volume or to any logical partition within a volume.

One of the goals of the EVMS is to be able to emulate the logical volume management systems found in other operating systems. Given the architecture as discussed thus far, it should be possible to emulate many other volume group based and partition based LVMs by creating an appropriate set of plug-in modules (Device Managers, Partition Managers, VGEs, and Features) and a user interface to wrap around the LVM Engine.

Figure 5:
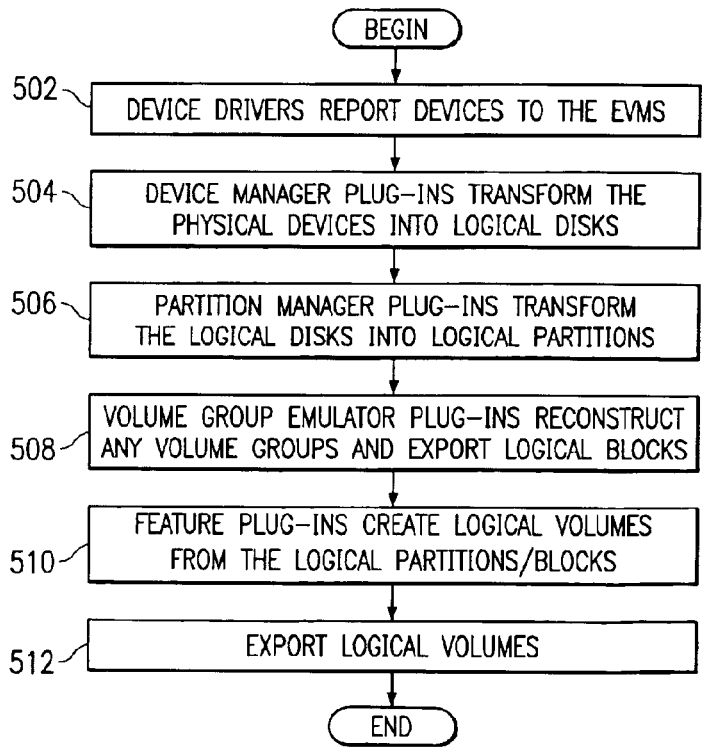
FIG. 5 is a flowchart illustrating the operation of an enterprise volume management system in accordance with a preferred embodiment of the present invention.

With reference now to FIG. 5, a flowchart illustrates the operation of an enterprise volume management system in accordance with a preferred embodiment of the present invention. The process begins and the device drivers in the system report devices to the EVMS (step 502). The EVMS then uses the device manager plug-in modules to transform the physical devices into logical disks (step 504). The EVMS then uses the partition manager plug-in modules to transform the logical disks into logical partitions (step 506). Next, the EVMS uses the volume group emulator plug-in modules to reconstruct any volume groups that may exist and export their logical blocks (step 508). Now the EVMS uses feature plug-in modules to create logical volumes from the logical partitions/blocks (step 510). The logical volumes created by the EVMS are then exported by the EVMS for use by the operating system (step 512) and the process ends.

Thus, the present invention provides a mechanism by which an LVM may handle multiple device managers. The present invention provides logical disks, which may be created by device managers. The LVM may be modified to use only logical disks. The device managers are made to be plug-in modules, which allows device managers to be added to the LVM at any time without the need for code changes in the LVM.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description but is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

What is claimed:

1. A method for providing device management in a logical volume management system, comprising:

receiving device information from a device driver for a device;

transforming the device into a logical disk based on the device information from the device driver, wherein the device is transformed into the logical disk prior to creating any logical partitions for the device;

modifying the logical volume management system to create the logical partitions for the device from the logical disk;

transforming the logical disk into a logical partition; and constructing a volume group from the logical partition, wherein the volume group is constructed by a volume group emulator plug-in module.

2. The method of claim 1, wherein the device is transformed into the logical disk by a device manager plug-in module.

3. The method of claim 1, wherein the logical disk is transformed into the logical partition by a partition manager plug-in module.

4. The method of claim 1, further comprising:

creating a logical volume from the logical partition.

5. The method of claim 4, wherein the logical volume is created by a feature plug-in module.

6. The method of claim 4, further comprising:

exporting the logical volume.

7. An apparatus for providing device management in a logical volume management system, comprising:

receipt means for receiving device information from a device driver for a device;

logical disk means for transforming the device into a logical disk based on the device information from the device driver, wherein the device is transformed into the logical disk prior to creating any logical partitions for the device;

logical volume management system means for modifying the logical volume management system to create the logical partitions for the device from the logical disk;

logical partition means for transforming the logical disk into a logical partition; and volume group means for constructing a volume group from the logical partition, wherein the volume group means comprises a volume group emulator plug-in module.

8. The apparatus of claim 7, wherein the logical disk means comprises a device manager plug-in module.

9. The apparatus of claim 7, wherein the logical partition means comprises a partition manager plug-in module.

10. The apparatus of claim 7, further comprising:

logical volume means for creating a logical volume from the logical partition.

11. The apparatus of claim 10, wherein the logical volume means comprises a feature plug-in module.

12. The apparatus of claim 10, further comprising:

export means for exporting the logical volume.

13. A computer program product, in a computer readable medium, for providing device management in a logical volume management system, comprising:

instructions for receiving device information from a device driver for a device;

instructions for transforming the device into a logical disk based on the device information from the device driver, wherein the device is transformed into the logical disk prior to creating any logical partitions for the device;

instructions for modifying the logical volume management system to create the logical partitions for the device from the logical disk;

instructions for transforming the logical disk into a logical partition; and instructions for constructing a volume group from the logical partition, wherein the volume group, is constructed by a volume group emulator plug-in module.

14. The computer program product of claim 13, wherein the instructions for transforming the device into a logical disk comprise a device manager plug-in module.

* * * * *